(12) United States Patent
Rousu et al.

(10) Patent No.: US 8,416,758 B1
(45) Date of Patent: Apr. 9, 2013

(54) RECONFIGURABLE RADIO FREQUENCY CIRCUITS AND METHODS OF RECEIVING

(71) Applicant: Renesas Mobile Corporation, Tokyo (JP)

(72) Inventors: Seppo Rousu, Oulu (FI); Juha Valtanen, Oulu (FI)

(73) Assignee: Renesas Mobile Corporation, Tokyo (JP)

(*) Notice: Subject to any disclaimer, the term of this patent is extended or adjusted under 35 U.S.C. 154(b) by 0 days.

(21) Appl. No.: 13/671,731

(22) Filed: Nov. 8, 2012

(30) Foreign Application Priority Data

Mar. 16, 2012 (GB) .................................. 1204691.8

(51) Int. Cl.
| | |
|---|---|
| *H04J 1/00* | (2006.01) |
| *H04J 1/02* | (2006.01) |
| *H04B 7/08* | (2006.01) |
| *H04B 1/18* | (2006.01) |
| *H04B 1/16* | (2006.01) |

(52) U.S. Cl.
USPC ........... 370/343; 370/484; 370/497; 455/132; 455/150.1; 455/338

(58) Field of Classification Search .......................... None
See application file for complete search history.

(56) References Cited

U.S. PATENT DOCUMENTS

| | | | | |
|---|---|---|---|---|
| 4,991,015 A | * | 2/1991 | Stepp ............................. | 455/132 |
| 5,790,555 A | * | 8/1998 | Narahashi et al. ............ | 370/480 |
| 6,765,930 B1 | * | 7/2004 | Oikawa ......................... | 370/479 |
| 7,505,746 B2 | * | 3/2009 | Okanobu ................... | 455/193.1 |
| 8,019,300 B2 | * | 9/2011 | Kim et al. .................. | 455/179.1 |
| 8,265,118 B2 | * | 9/2012 | Tzeng et al. .................. | 370/342 |
| 2007/0046388 A1 | | 3/2007 | Sanders | |
| 2009/0117859 A1 | * | 5/2009 | Smith et al. ..................... | 455/78 |
| 2009/0124221 A1 | * | 5/2009 | Cho et al. ....................... | 455/132 |
| 2009/0275357 A1 | * | 11/2009 | Nakamura et al. ......... | 455/550.1 |

FOREIGN PATENT DOCUMENTS

| | | |
|---|---|---|
| EP | 1 394 957 A1 | 3/2004 |
| KR | 200722565 A | 9/2008 |

OTHER PUBLICATIONS

Search Report under Section 17 dated Jul. 18, 2012 which is issued in a related British Application No. GB1204691.8 (4 pages).

* cited by examiner

*Primary Examiner* — Timothy J Weidner
(74) *Attorney, Agent, or Firm* — Lucas & Mercanti LLP; Robert P. Michai

(57) ABSTRACT

A reconfigurable radio frequency circuit is configurable to a first mode when first and second radio frequency signals are within a first frequency band, and to a second mode for use when the first but not the second signal is in the first band. A first signal divider operating in the first band provides a first signal division ratio in the first mode and a second ratio in the second mode. In the first mode, a first output of the signal divider is connected by a first switch to a first receiver and the second output is connected by a second switch to a second receiver. In the second mode, the first output is connected by the first switch to the first receiver and a second divider operating in a second band is connected by the second switch to the second receiver.

24 Claims, 13 Drawing Sheets

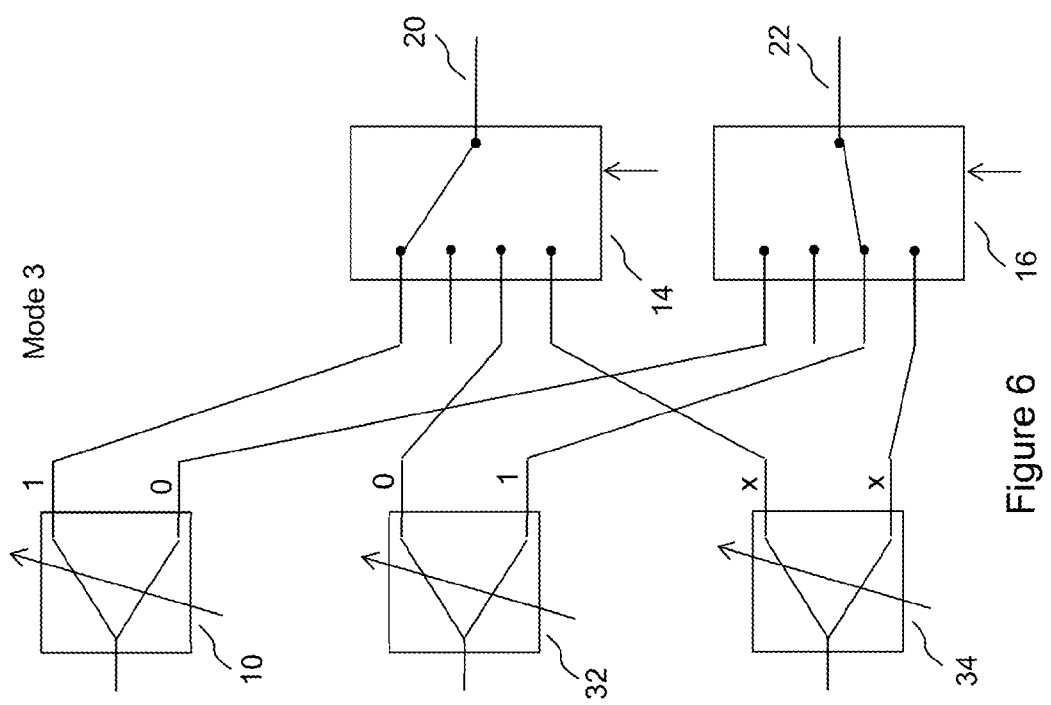

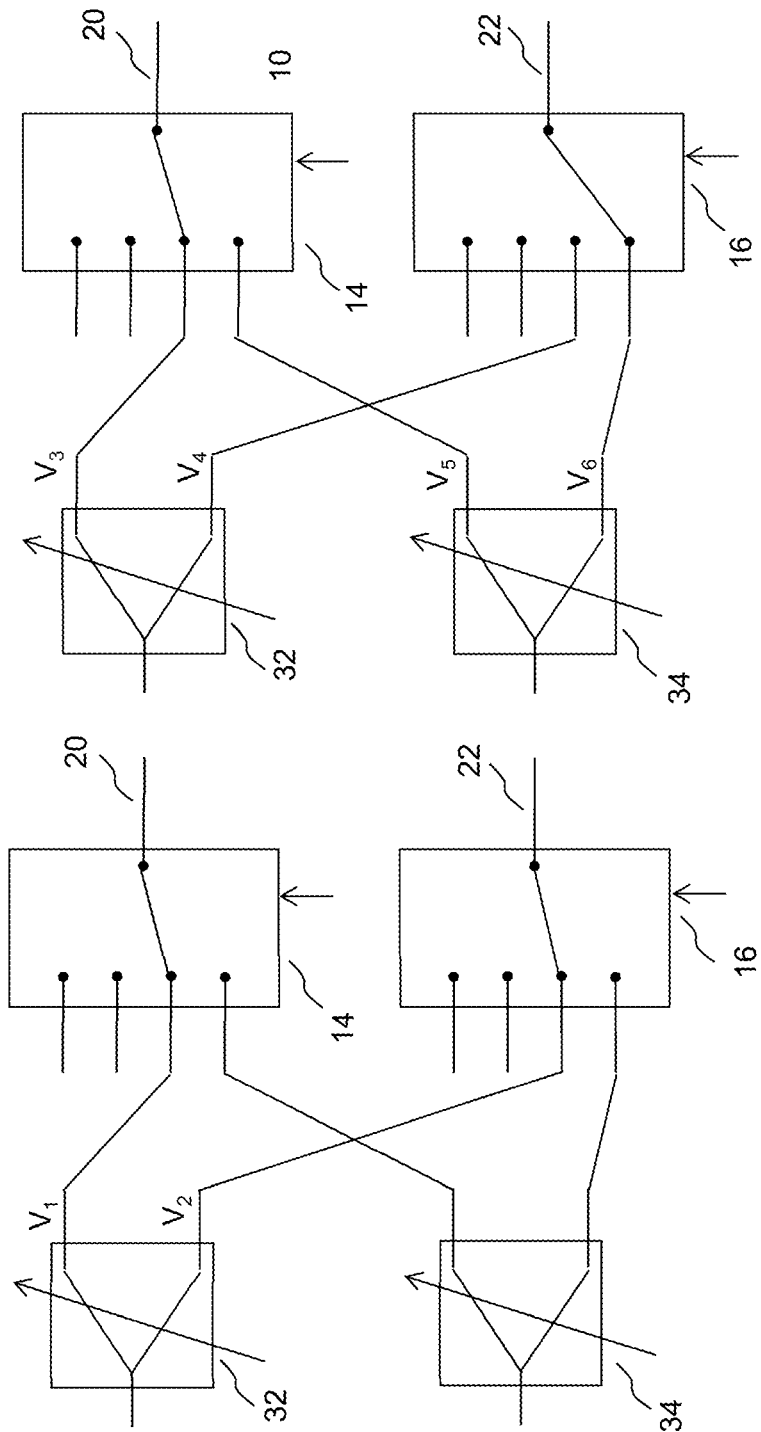

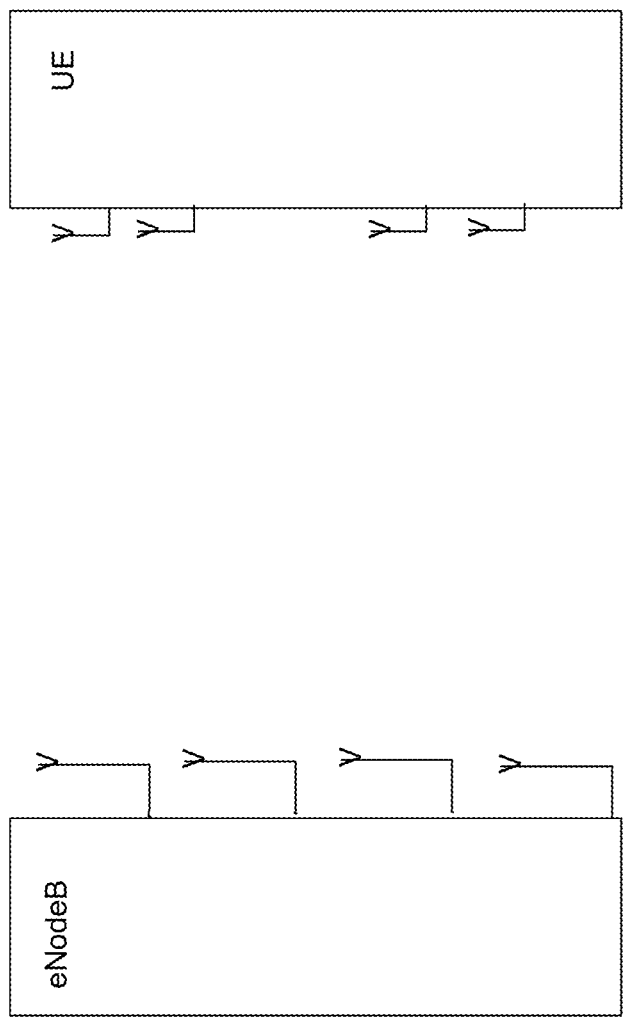

RECONFIGURABLE RADIO FREQUENCY CIRCUITS AND METHODS OF RECEIVING

CROSS REFERENCE TO RELATED APPLICATION

This application claims the benefit under 35 U.S.C. §119 (a) and 37 CFR §1.55 to UK Patent Application No. 1204691.8, filed on Mar. 16, 2012, the entire disclosure of which is incorporated herein by reference.

TECHNICAL FIELD

The present invention relates to reconfigurable radio frequency circuits, methods of receiving and receivers for radio communication systems, and in particular, but not exclusively, to carrier aggregation schemes.

BACKGROUND INFORMATION

Long Term Evolution (LTE) Advanced is a mobile telecommunication standard proposed by the $3^{rd}$ Generation Partnership Project (3GPP) and first standardised in 3GPP Release 10. In order to provide the peak bandwidth requirements of a $4^{th}$ Generation system as defined by the International Telecommunication Union Radiocommunication (ITU-R) Sector, while maintaining compatibility with legacy mobile communication equipment, LTE Advanced proposes the aggregation of multiple carrier signals (carrier components) in order to provide a higher aggregate bandwidth than would be available if transmitting via a single carrier signal. This technique of Carrier Aggregation (CA) requires each utilised carrier signal, that is to say radio frequency signal, to be demodulated in a receiver at a wireless communications terminal, whereafter the message data from each of the signals can be combined in order to reconstruct the original data. Carrier Aggregation can be used also in other radio communication protocols such as High Speed Packet Access (HSPA).

Carrier Aggregation may involve aggregation of radio frequency signals that are transmitted in the same frequency band, or aggregation of radio frequency signals that are transmitted in different frequency bands. A frequency band may be a range of radio frequencies allocated to an operator as a contiguous block, or part of a contiguous block, and typically a radio receiver for receiving a radio frequency signal will have a front end band pass filter arranged to encompass the frequency band, but reject signals transmitted in other bands and/or out of band. The front end filter serves to protect the receiver from saturation, blocking and interference by out of band signals, which may be at a high power level and beyond the operator's control.

If data is transmitted using carrier aggregation of radio frequency signals that are transmitted in the same frequency band, a single band pass filter may be used to receive the carrier aggregated signals, and a receiver chain for each of the radio frequency signals may be arranged to receive signals that have passed through the band pass filter. However, if data is transmitted using carrier aggregation of radio frequency signals that are transmitted in different frequency bands, more than one band pass filter is typically required to receive the carrier aggregated signals, and each receiver chain typically needs to be arranged to receive signals that have passed through the appropriate band pass filter.

A radio receiver may also be required to be configured for use in multi-SIM (Subscriber Information Module) operation, in which data or paging signals may be received using several carriers, each carrier typically relating to a SIM or USIM (Universal Subscriber Information Module), the carriers being in either the same or different operating frequency bands.

A wireless communications terminal may be required to be reconfigurable between a configuration for receiving data that is transmitted using carrier aggregation or multi-SIM operation of radio frequency signals in the same band, and a configuration for receiving data that is transmitted using carrier aggregation or multi-SIM operation of radio frequency signals in different bands. A reconfigurable radio frequency circuit is required for use in such a wireless communications terminal, to allow appropriately filtered signal paths having required radio frequency performance to be configured between one or more antennas and receive chains used to receive respective radio frequency signals, which may have been transmitted in the same or different frequency bands.

SUMMARY in accordance with an exemplary embodiment, there is provided reconfigurable radio frequency circuit for use in a wireless communications terminal the circuit including:

a receiver configured to receive at least first and second radio frequency signals;

a first signal divider for dividing signals in a first frequency band, the first signal divider being arranged to divide signals between at least a first divider output and a second divider output;

a second signal divider for dividing signals in a second frequency band, the second signal divider being arranged to divide signals between at least a third divider output and a fourth divider output;

a first radio frequency switch for connecting the first divider output to a first switch output for connection to first a receiver chain for receiving the first radio frequency signal in a first and a second mode, the circuit being configurable to the first mode when the first and second radio frequency signals are within the first frequency band, and being configurable to the second mode when the first radio frequency signal is within the first frequency band and the second radio frequency signal is within the second frequency band, different from the first frequency band; and a second radio frequency switch for connecting the second divider output to a second switch output in the first mode and to connect the fourth divider output to the second switch output in the second mode, the second switch output being for connection to a second receiver chain for receiving the second radio frequency signal, wherein the first signal divider is configured with a signal division ratio and is controllable, in the first mode, to a first state in which a first signal division ratio is set between the first and second divider outputs, and in the second mode, to a second state in which a second signal division ratio, different from the first signal division ratio, is set between the first and second outputs.

An advantage of the first signal divider being controllable, in the first mode, to a first state in which a first signal division ratio is set between the first and second divider outputs, and in the second mode, to a second state in which a second signal division ratio, different from the first signal division ratio, is set between the first and second outputs is that the signal division ratio may be set to a value such that so that radio frequency performance in terms of signal to noise figure and sensitivity is improved in the signal paths to be used in the respective mode. For example, the first signal divider may be controlled to divide the signal substantially equally between the signal divider output ports in the first mode so that the signal gain or loss in the paths from the antenna to the first and second receivers is set to be roughly equal, so that equivalent radio frequency performance in terms of signal to noise figure and sensitivity may be expected for each path. In the second mode, the signal divider may be set to divide the signal so that most, or substantially all, of the power is directed to the first divider output, which is connected to the first radio frequency switch 14, and less, or very little, power is directed to the second divider output, which may not be used for signal transmission in the second mode.

An advantage of setting the first signal divider to divide the signal so that most of the power is directed to the first divider output is that loss in this signal path is minimised, so that radio frequency performance in terms of signal to noise figure and sensitivity may be optimised. An additional advantage is that, since less power is directed to the second divider output, signal leakage from the unselected ports of the second radio frequency switch is minimised.

In accordance with a second exemplary embodiment, there is provided a wireless communications terminal including the reconfigurable radio frequency circuit.

In accordance with a third exemplary embodiment, there is provided a method for use in a wireless communication terminal, the method including:

receiving at least first and second radio frequency signals, using a radio frequency circuit that is configurable to a first mode for use when the first and second radio frequency signals are within a first frequency band, and to a second mode for use when the first radio frequency signal is within the first frequency band and the second radio frequency signal is within a second frequency band, different from the first frequency band;

using a first signal divider to divide signals received in the first frequency band between a first divider output and at least a second divider output;

using a second signal divider to divide signals received in the second frequency band between a third divider output and at least a fourth divider output;

setting a first radio frequency switch to connect the first divider output to a first switch output for connection to a first receiver chain for receiving the first radio frequency signal in the first and second modes;

setting a second radio frequency switch to connect the second divider output to a second switch output in the first mode and to connect the third divider output to the second switch output in the second mode, the second switch output being for connection to a second receiver chain for receiving the second radio frequency signal;

in which the first signal divider is configured with a division ratio and the method includes setting the division ratio of the first signal divider to a first ratio in the first mode and to a second ratio, different from the first ratio, in the second mode.

Further features and advantages of the invention will be apparent from the following description of preferred embodiments of the invention, which are given by way of example only.

BRIEF DESCRIPTION OF THE DRAWINGS

FIG. 6 is a schematic diagram showing a radio frequency circuit in an embodiment of the invention configured to a third mode;

FIG. 7 is a schematic diagram showing a radio frequency circuit in an embodiment of the invention with a first divider set to a division ratio in the first mode so as to reduce a difference between a signal power of a first and second radio frequency signal;

FIG. 8 is a schematic diagram showing a radio frequency circuit in an embodiment of the invention with first and second dividers set to respective division ratios in the second mode so as to reduce a difference between a signal power of a first and second radio frequency signal;

FIG. 14 shows a base station (eNodeB) and a User Equipment (UE) according to an embodiment of the invention.

DETAILED DESCRIPTION

By way of example an embodiment of the invention will now be described in the context of a wireless communications system supporting communication using E-UTRA radio access technology, as associated with E-UTRAN radio access networks in LTE systems. However, it will be understood that this is by way of example only and that other embodiments may involve wireless networks using other radio access technologies, such as HSPA, UTRAN, GERAN, CDMA, IEEE802.16 or WiMax systems, or 802.11.

Figure 1:
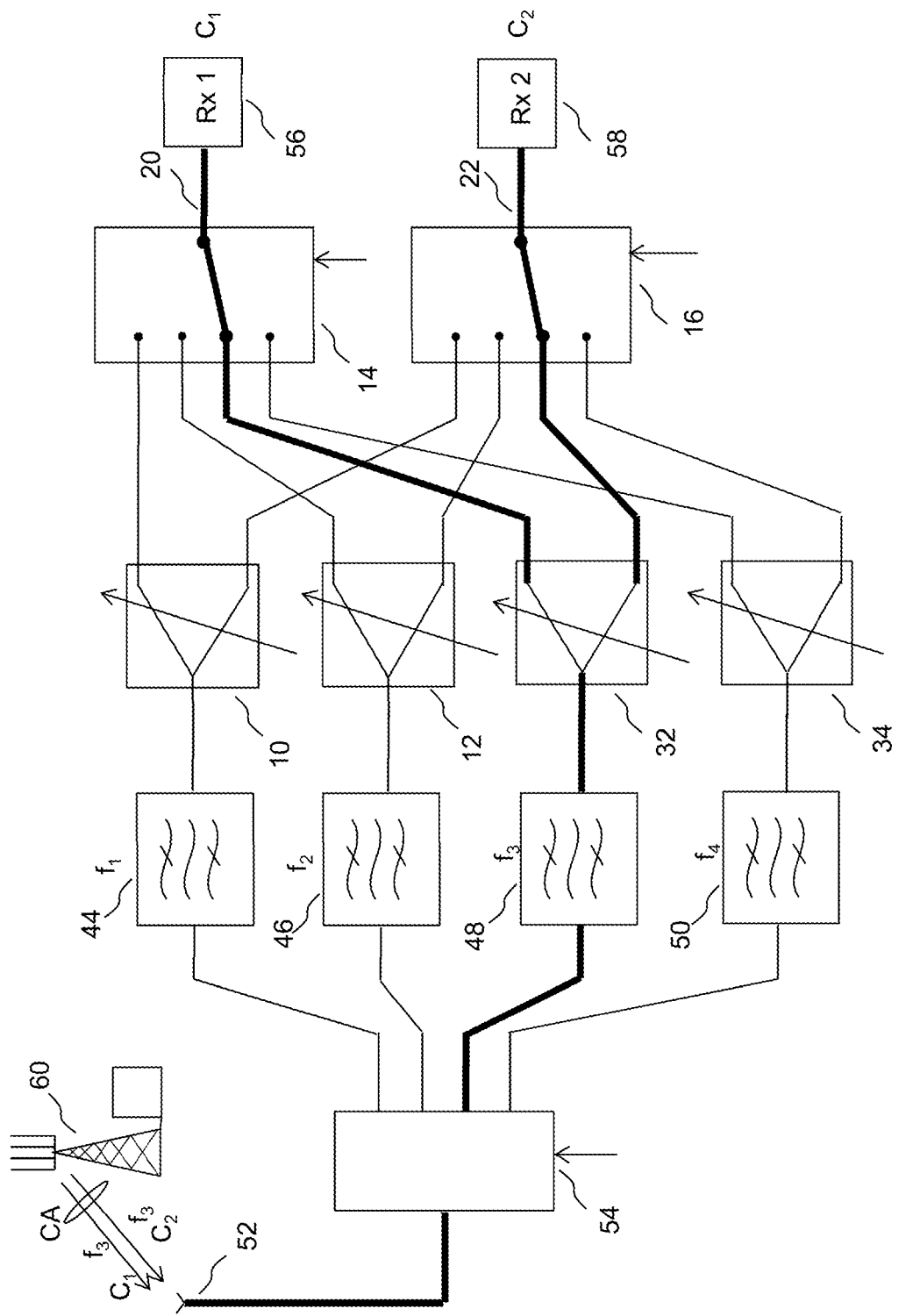
FIG. 1 is a schematic diagram showing an example of signal paths through a receiver including a radio frequency circuit configured for reception of two radio frequency signals transmitted in the same frequency band, in an embodiment of the invention.
Figure 2:
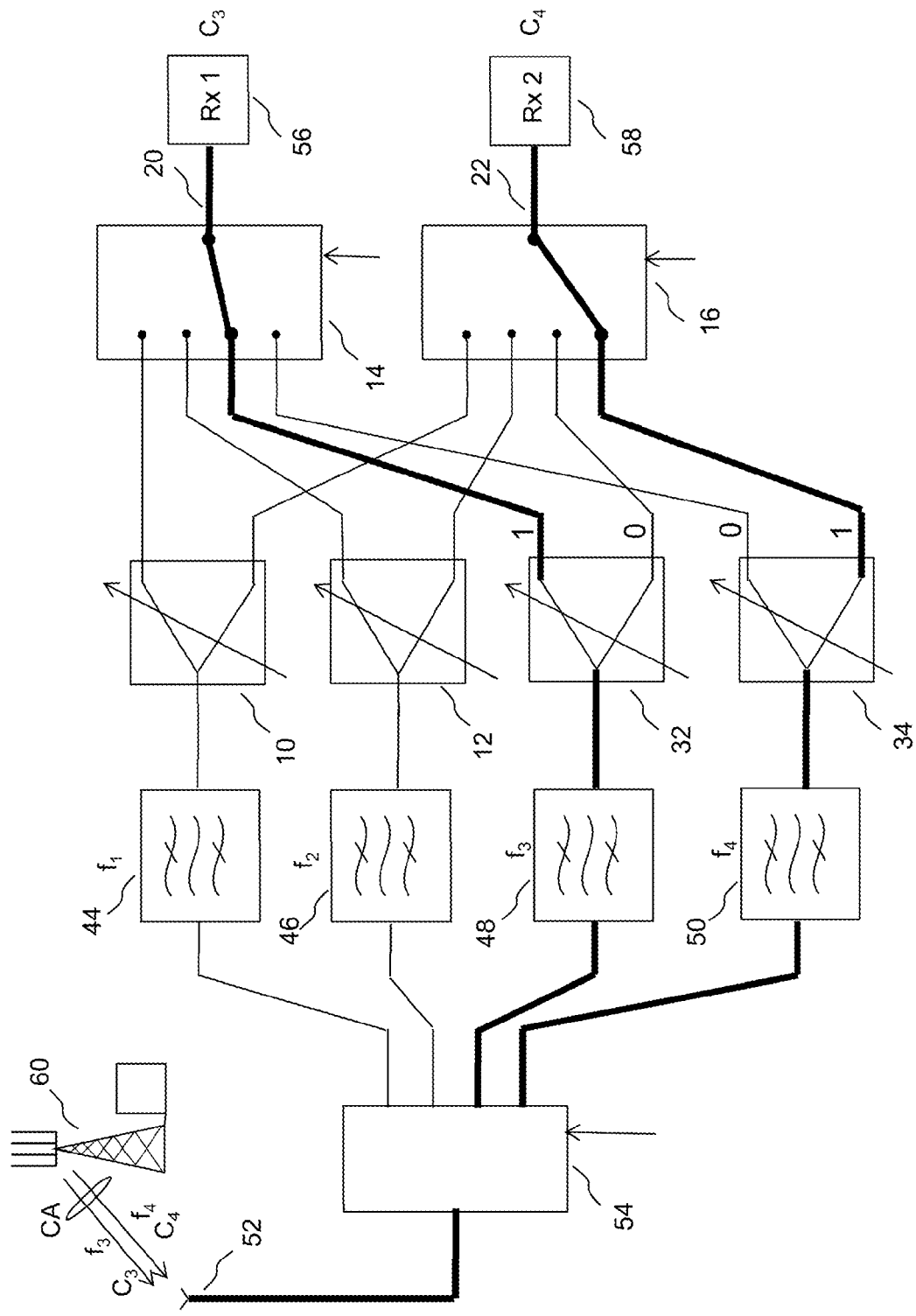
FIG. 2 is a schematic diagram showing an example of signal paths through a receiver including a radio frequency circuit configured for reception of two radio frequency signals transmitted in different respective frequency bands in an embodiment of the invention.
Figure 3:
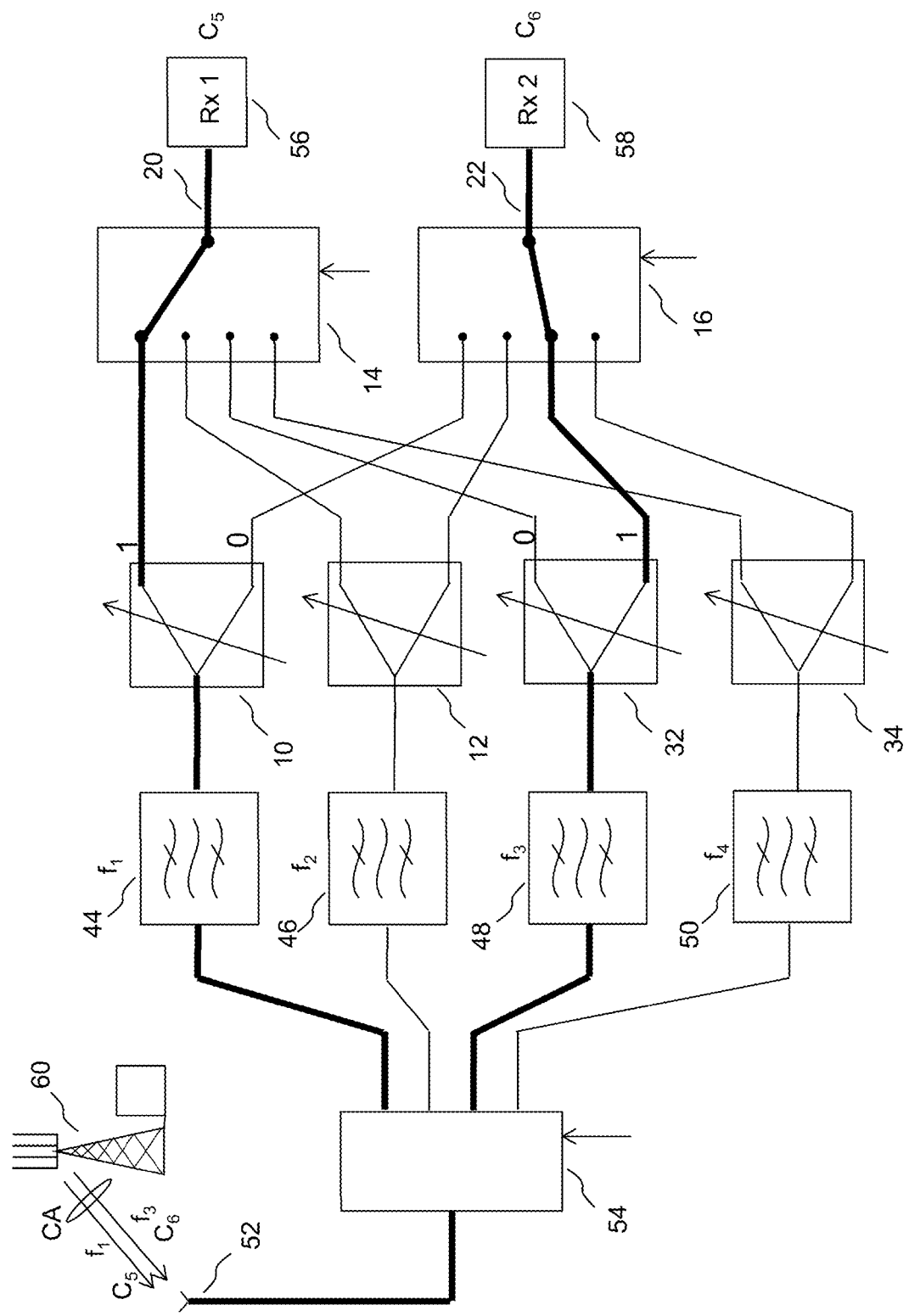
FIG. 3 is a schematic diagram showing a further example of signal paths through a receiver including a radio frequency circuit configured in a third mode for reception of two radio frequency signals transmitted in different respective frequency bands in an embodiment of the invention.

An embodiment of the invention relates to a reconfigurable radio frequency circuit, which may include a radio Frequency Integrated Circuit (RFIC), for use in a wireless communications terminal, to allow appropriately filtered signal paths to be configured for reception of radio frequency signals, which may have been transmitted using carrier aggregation in the same or different frequency bands. The terminal may also be required to be configured for use in single SIM or multi-SIM (Subscriber Information Module) operation, in which data, network measurements, network positioning measurements or paging signals may be received using several carriers, each carrier typically relating to a respective SIM or USIM (Universal Subscriber Information Module), the carriers being in either the same or different operating frequency bands. FIGS. 1, 2 and 3 shows a reconfigurable radio frequency circuit according to an embodiment of the invention configured to a first, second and third mode of operation respectively. In each case, two or more radio frequency signals using, for example, carrier aggregation (CA) are transmitted by a base station 60 and are received by an antenna or antenna system 52, and are passed by an antenna switching arrangement 54 to one or more band pass filters 44, 46, 48, 50.

The two or more radio frequency signals may use carrier aggregation between signals that are transmitted from different base stations. At least one of the two or more radio frequency signals may be used for measurement of a radio channel or for positioning measurements, such as OTDOA (Observed Time Difference of Arrival) measurements, which may use signals at multiple frequencies to increase accuracy.

The band pass filters each encompass a frequency band, in this example four band pass filters are shown encompassing frequency bands $f_1$, $f_2$, $f_3$, and $f_4$, but other numbers of band pass filters may be employed. The band pass filters may be, for example, a block of filters operating at low band (nominally around 1 GHz), a block of filters operating at a mid band (nominally around 1.5 GHz), a block of filters operating at a high band (nominally around 2 GHz), a block of filters operating at a very high band (nominally around 2.6 GHz), or a block of filters operating at a ultra high band (nominally around 3.6 GHz). The output of each filter is connected to a respective controllable signal divider 10, 12, 32, 34. Each signal divider divides the signal received at its input according to a controllable division ratio between two divider outputs, one of which is connected to a first radio frequency switch 14 and the other of which is connected to a second radio frequency switch 16. The first radio frequency switch 14 is controllable to select one of the divider outputs to connect to a first receiver chain Rx1 56 for receiving a first radio frequency signal, and the second radio frequency switch 16 is controllable to select one of the divider outputs to connect to a second receiver chain Rx2 58 for receiving a second radio frequency signal.

The signal dividers may be controlled to a state in which signal is divided substantially equally between the outputs, to a state in which substantially all of the signal is passed to a first output and very little signal is passed to the second output, or to a third state in which substantially all of the signal is passed to a second output and very little signal is passed to the first output. In other embodiments, the signal divider may be controlled to set other division ratios.

A signal divider according to an embodiment of the invention may be a power divider, a voltage divider or a current divider. The signal divider may be implemented, for example, by selecting resistors from a resistor array under digital control in order to control the split of power while maintaining an appropriate impedance match. Alternatively, a voltage split may be arranged using a similar method. The skilled person would also be aware of methods of implementing a programmable voltage divider by using PIN (P-type Intrinsic N-type) diodes or FETs (Field Effect Transistors) to provide a variable resistance at RF (Radio Frequency). Variable gain amplifiers may also be used.

FIG. 1 shows the radio frequency circuit configured in a first mode, in an embodiment of the invention, for reception of two radio frequency signals $C_1$ and $C_2$ transmitted by a base station 60 using carrier aggregation (CA) in a frequency band $f_3$. The two radio frequency signals, that is to say carrier components, are received by the antenna or antenna system 52, and the antenna switching arrangement 54 is set to pass the received signals to the band pass filter 48 encompassing frequency band $f_3$. After filtering by the band pass filter 48, both the first and second radio frequency signals are passed to a first controllable signal divider 32, in which the signal of each signal is divided between the first and second divider outputs according to a controllable signal division ratio. In the first mode shown in FIG. 1, the first signal divider is set to divide the signal substantially equally between the signal divider output ports. As shown by FIG. 1, in the first mode of operation, the first radio frequency switch 14 is set to connect the first signal divider output to the first switch output 20, for connection to the first receiver chain Rx1, to receive the first radio frequency signal. Also as shown by FIG. 1, the second radio frequency switch 16 is set to connect the second signal divider output to the second switch output 22, for connection to the second receiver chain Rx2, to receive the second radio frequency signal. The first signal divider being controllable, in the first mode, to a first state in which a first signal division ratio is set between the first and second divider outputs, and in the second mode, to a second state in which a second signal division ratio, different from the first signal division ratio, is set between the first and second outputs, so that the signal division ratio may be set to a value such that so that radio frequency performance in terms, for example, of signal to noise ratio, noise figure and sensitivity may be improved in the signal paths to be used in the respective mode. For example, the first signal divider may be set to divide the signal substantially equally between the signal divider output ports so that the signal loss in the paths from the antenna to the first and second receivers is set to be roughly equal, so that equivalent radio frequency performance in terms of signal to noise figure and sensitivity may be expected for each path. This is particularly advantageous if the first and second radio frequency signals are expected at similar powers, as may, in some circumstances, be the case for carrier aggregated signals transmitted in the same band. In some deployment circumstances, the first and second radio signals may be received at different powers, due, for example, to fading or transmission from different base stations. In the second mode, the signal divider may be set to divide the signal so that most, or substantially all, of the power is directed to the first divider output, which is connected to the first radio frequency switch 14, and less, or very little, power is directed to the second divider output, which may not be used for signal transmission in the second mode. An advantage of setting the first signal divider to divide the signal so that most of the power is directed to the first divider output is that loss in this signal path is minimised, so that radio frequency performance in terms of signal to noise figure and sensitivity may be optimised.

FIG. 2 shows the radio frequency circuit configured in a second mode, in an embodiment of the invention, for reception of two radio frequency signals $C_3$ and $C_4$ transmitted by the base station 60 using carrier aggregation (CA) in different frequency bands, the first radio frequency signal being in band $f_3$ and the second being in band $f_4$. The two radio frequency signals, are received by the antenna or antenna system 52, and the antenna switching arrangement 54 is set to split, that is to say "convoy" the received signals and pass them to both the third band pass filter 48 encompassing frequency band $f_3$ and the fourth band pass filter 50 encompassing frequency band $f_4$. Convoying to two or more signal paths may be done with diplexer, duplexer, and/or a switch having multiple throws active at same time, for example.

After filtering by the third band pass filter 48, the first radio frequency signal $C_3$ is passed to the first controllable signal divider 32, which is set in the second mode to divide the signal so that most, or substantially all, of the power is directed to the first divider output, which is connected to the first radio frequency switch 14, and very little power is directed to the second divider output, any power being directed to the second divider output being leakage power. As shown by FIG. 2, in the second mode of operation, the first radio frequency switch 14 is set to connect the first signal divider output to the first switch output 20, for connection to the first receiver chain Rx1, to receive the first radio frequency signal $C_3$.

After filtering by the fourth band pass filter 50, the second radio frequency signal $C_4$ is passed to a second controllable signal divider 34, which is set in the second mode to divide the signal so that most, or substantially all, of the power is directed to the fourth divider output, which is connected to the second radio frequency switch 16, and very little power is directed to the third divider output. The second radio frequency switch 16 is set to connect the fourth signal divider output to the second switch output 22, for connection to the second receiver Chain Rx2, to receive the second radio frequency signal $C_4$.

An advantage of setting the first signal divider to divide the signal so that most of the power is directed to the first divider output is that loss in this signal path is minimised, so that radio frequency performance in terms of signal to noise figure and sensitivity may be optimised. An additional advantage is that, since very little power is directed to the second divider output, signal leakage from the unselected ports of the second radio frequency switch is minimised. Corresponding advantages apply to the setting of the second signal divider in the second mode.

FIG. 3 shows the radio frequency circuit configured in a third mode, in an embodiment of the invention, for reception of two radio frequency signals $C_5$ and $C_6$ transmitted using carrier aggregation (CA) in different frequency bands, the first radio frequency signal being in band $f_3$ and the second being, in this example, in band $f_1$. In this case, the antenna switching arrangement 54 is set to convoy the received signals and pass them to both the third band pass filter 48 encompassing frequency band $f_3$ and the first band pass filter 44 encompassing frequency band $f_4$. After filtering by the third band pass filter 48, the first radio frequency signal $C_5$ is passed to the first controllable signal divider 32, but in contrast to the case in the second mode, the first signal divider is set in the third mode to divide the signal so that most, or substantially all, of the power is directed to the second divider output, which is connected to the second radio frequency switch 16, and very little power is directed to the first divider output. As shown by FIG. 3, in the second mode of operation, the second radio frequency switch 16 is set to connect the second signal divider output to the second switch output 22, for connection to the second receiver chain Rx2, to receive the first radio frequency signal $C_6$.

After filtering by the first band pass filter 44, the second radio frequency signal $C_5$ is passed to a third controllable signal divider 10, which is set in the third mode to divide the signal so that most, or substantially all, of the power is directed to the fifth divider output, which is connected to the first radio frequency switch 14, and very little power is directed to the sixth divider output. The first radio frequency switch 14 is set to connect the fifth signal divider output to the first switch output 20, for connection to the first receiver chain Rx1, to receive the second radio frequency signal $C_5$.

So, it has been shown in FIGS. 1, 2 and 3 that at least the first signal divider 32 may be set to one of at least three states: substantially equal split, most or substantially all power to the first output, or most or substantially all power to the second output. Typically, when most of the power is directed to on output, the power at that output will be more than 10 dB higher than the power at the other output.

Figure 4:
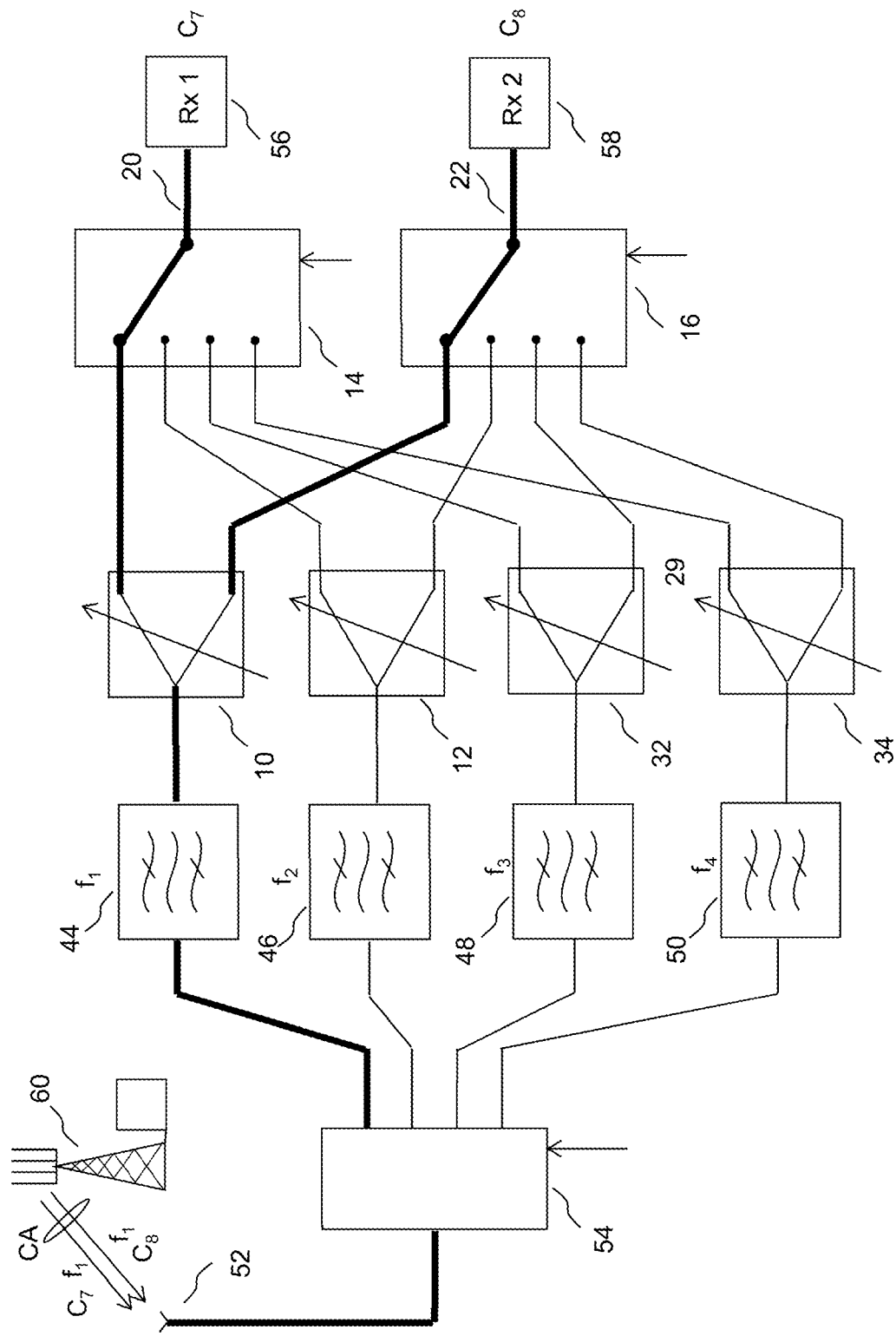
FIG. 4 is a schematic diagram showing a further example of signal paths through a receiver including a radio frequency circuit configured for reception of two radio frequency signals transmitted in the same frequency band, in an embodiment of the invention.

FIG. 4 shows an alternative embodiment of the first mode.

Figure 5:
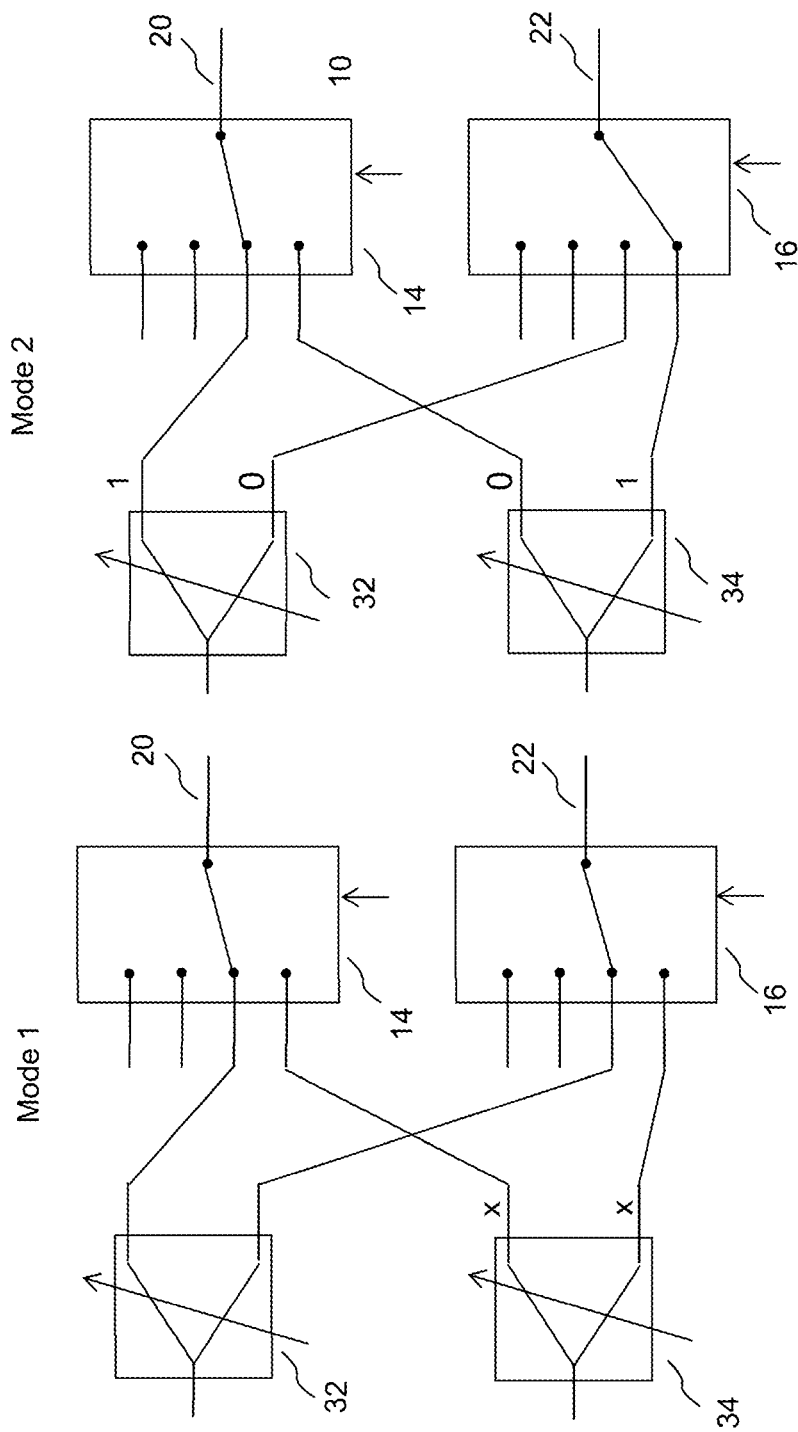
FIG. 5 is a schematic diagram showing a radio frequency circuit in an embodiment of the invention configured to a first mode and to a second mode.

FIG. 5 shows a radio frequency circuit in an embodiment of the invention configured to a first mode and to a second mode. As illustrated by FIG. 5, in an embodiment of the invention, a reconfigurable radio frequency circuit for use in a wireless communications terminal is configurable to a first mode for receiving a first and second radio frequency signal within a first frequency band, and to a second mode for use when the first but not the second signal is in the first band. A first signal divider (32) operating in the first band provides a first signal division ratio in the first mode and a second ratio in the second mode. In the first mode, a first output of the signal divider is connected by a first switch (14) to a first receiver and the second output is connected by a second switch (16) to a second receiver. In the second mode, the first output is connected by the first switch (14) to the first receiver and a second divider (34) operating in a second band is connected by the second switch (16) to the second receiver.

FIG. 6 shows a radio frequency circuit in an embodiment of the invention configured to third mode, in which the first signal divider (32) is set to a third signal division ratio.

FIG. 7 is a schematic diagrams showing a radio frequency circuit in an embodiment of the invention with a first divider set to a division ratio in the first mode so as to change, i.e alter or reduce a difference between a signal power of a first and second radio frequency signal, for example on the basis of a measurement of the signal powers of the first and second radio frequency signals. The measurements may be made, for example, at the first and second receiver chains.

FIG. 8 is a schematic diagram showing a radio frequency circuit in an embodiment of the invention with first and second dividers set to respective division ratios in the second mode so as to change i.e. alter or reduce a difference between a signal power of a first and second radio frequency signal.

Figure 9:
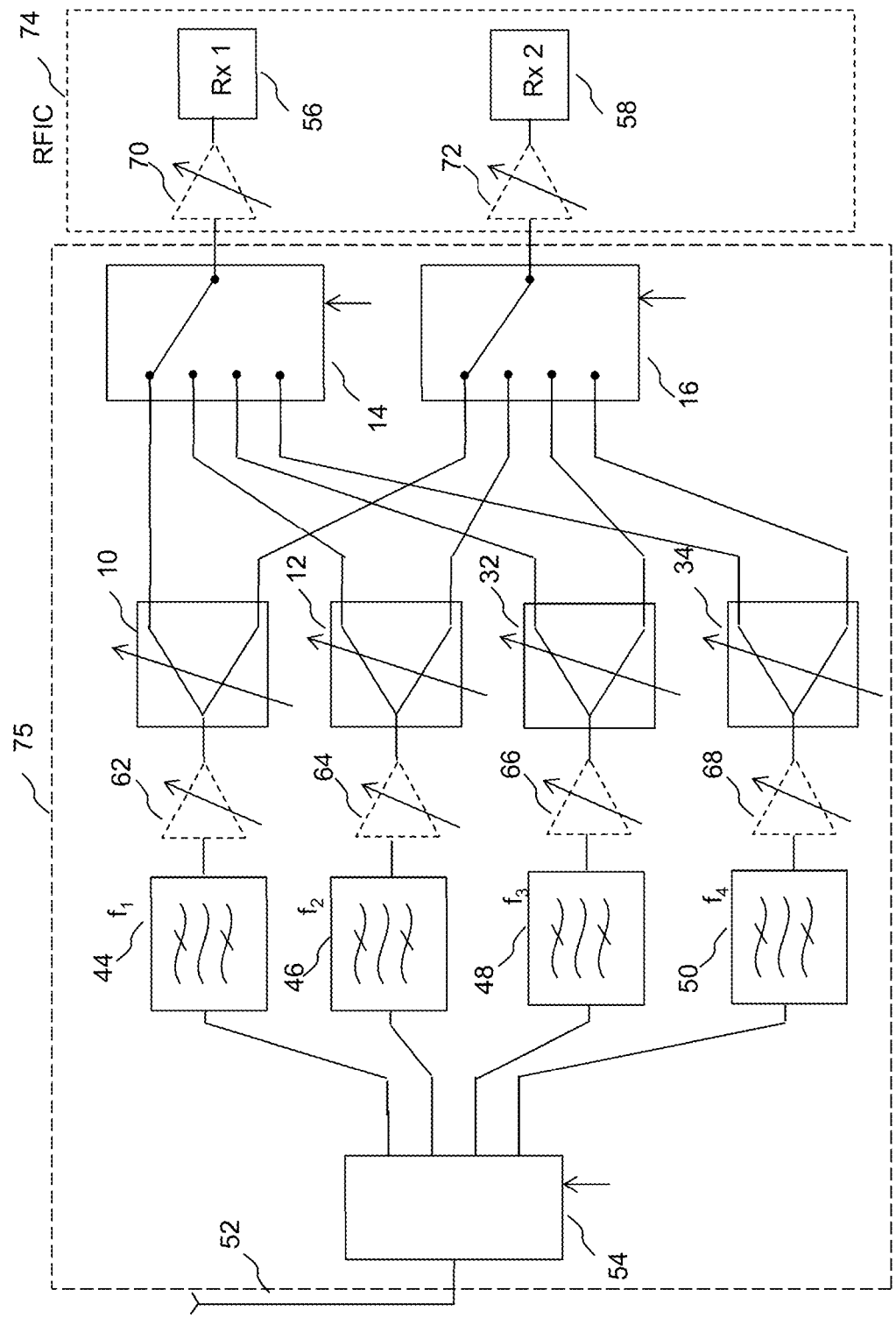
FIG. 9 is a schematic diagram showing a receiver including a radio frequency circuit in an embodiment of the invention, showing alternative positions of low noise amplifiers and a first example of a part of the circuit to be included on a Radio Frequency Integrated Circuit.
Figure 10:
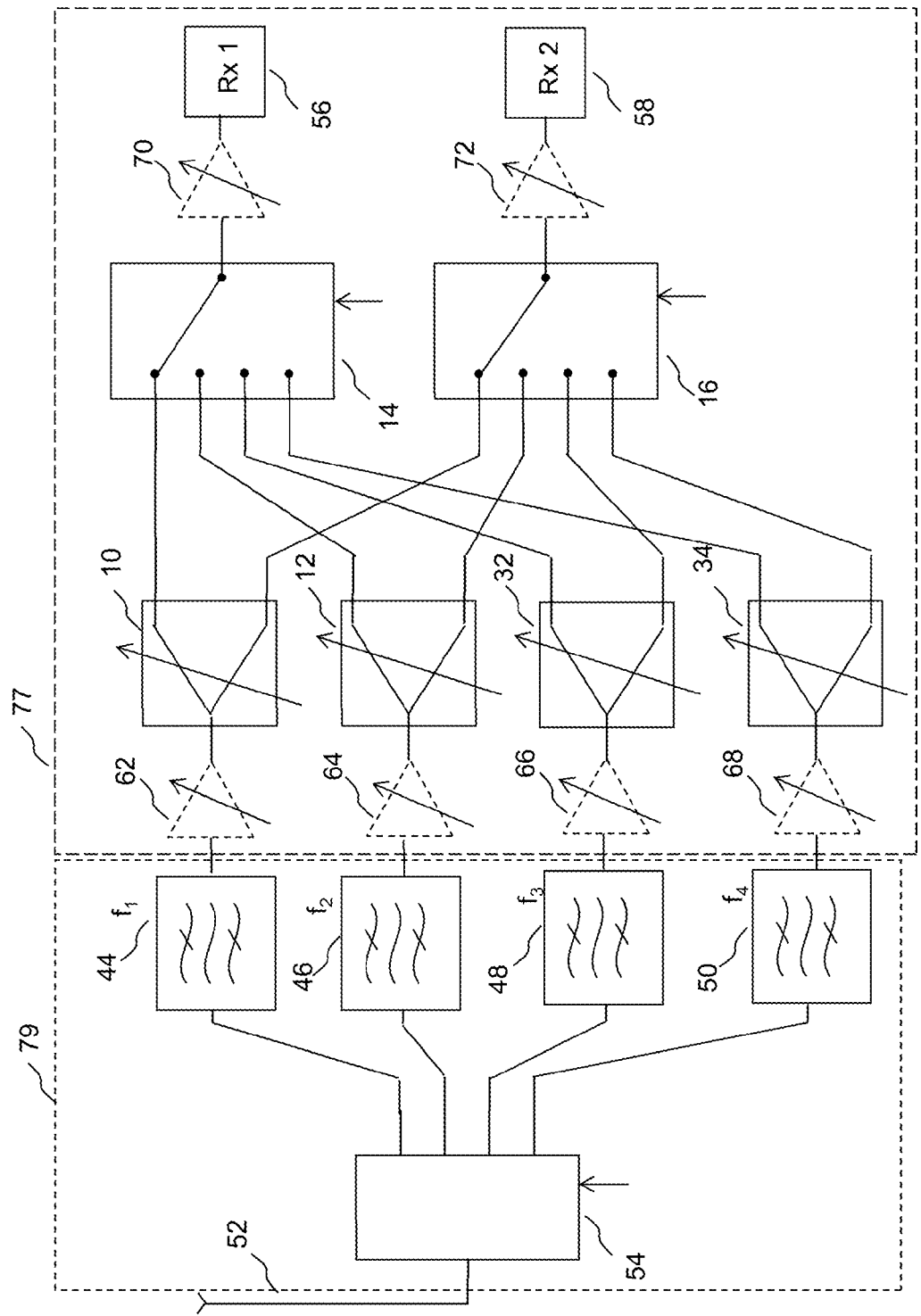
FIG. 10 is a schematic diagram showing a receiver including a radio frequency circuit in an embodiment of the invention, showing an alternative example of a part of the circuit to be included on a Radio Frequency Integrated Circuit.

FIG. 9 shows alternative positions of low noise amplifiers. In some embodiments, low noise amplifiers 70, 72 may be included after the first and second radio frequency switches, perhaps because the low noise amplifiers may be included in an existing circuit. In that case, low noise amplifiers 62, 64, 66, 68 preceding the dividers may be omitted, or powered down and by-passed. Alternatively, if no low noise amplifiers are included after the first and second radio frequency switches, or omitted, or powered down and by-passed, low noise amplifiers 62, 64, 66, 68 preceding the dividers may be activated. FIG. 10 also shows a first example of a part 74 of the circuit to be included on a Radio Frequency Integrated Circuit: low noise amplifiers 70, 72 and receivers 56, 58. The parts shown within the broken line 75, typically the signal dividers and radio frequency switches, and optionally bypassable low noise amplifiers, may be included in a module embodiment.

FIG. 10 shows an alternative example of a part of the circuit to be included on a first module 77; in this example, the first and second receiver chains may be included and also the signal dividers and radio frequency switches, for example.

The parts within the broken line 79 may be included in a second module. In alternative embodiment all functional blocks, for example the parts within the broken lines 77 and 79, may be implemented on SIP (System in Package) module.

Figure 11:
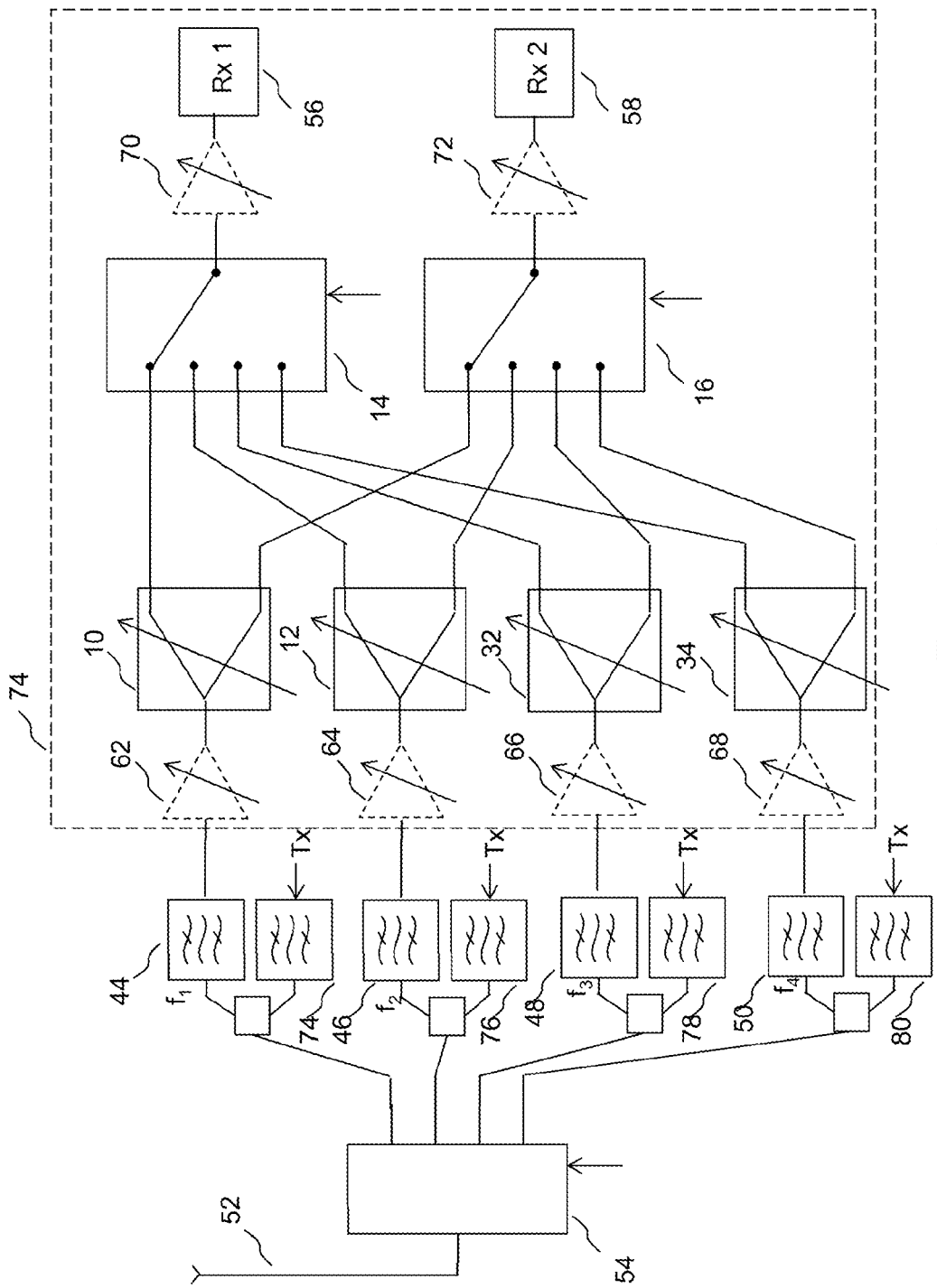
FIG. 11 is a schematic diagram showing a receiver including a radio frequency circuit in an embodiment of the invention, showing transmit and receive front end filters for use in a Frequency Division Duplex (FDD) system.

FIG. 11 shows parts of a Frequency Division Duplex system including both transmit 74, 76, 78, 80 and receive 44, 46, 48, 50 front end filters. For clarity power amplifiers and other potentially needed blocks are not shown for clarity.

Figure 12:
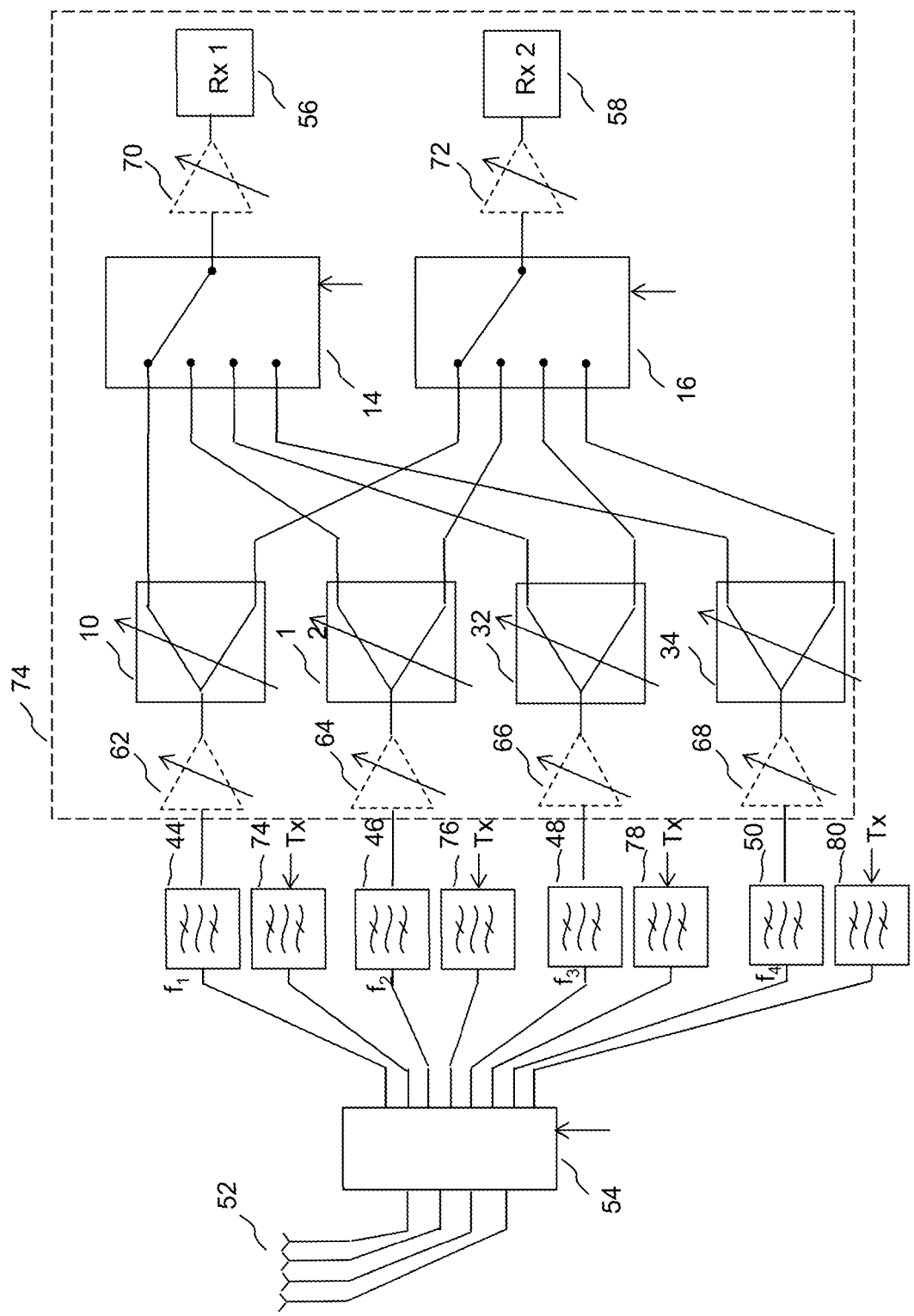
FIG. 12 is a schematic diagram showing a receiver including a radio frequency circuit in an embodiment of the invention, showing transmit and receive front end filters for use in a Time Division Duplex (TDD) system with multiple antennas.
Figure 13:
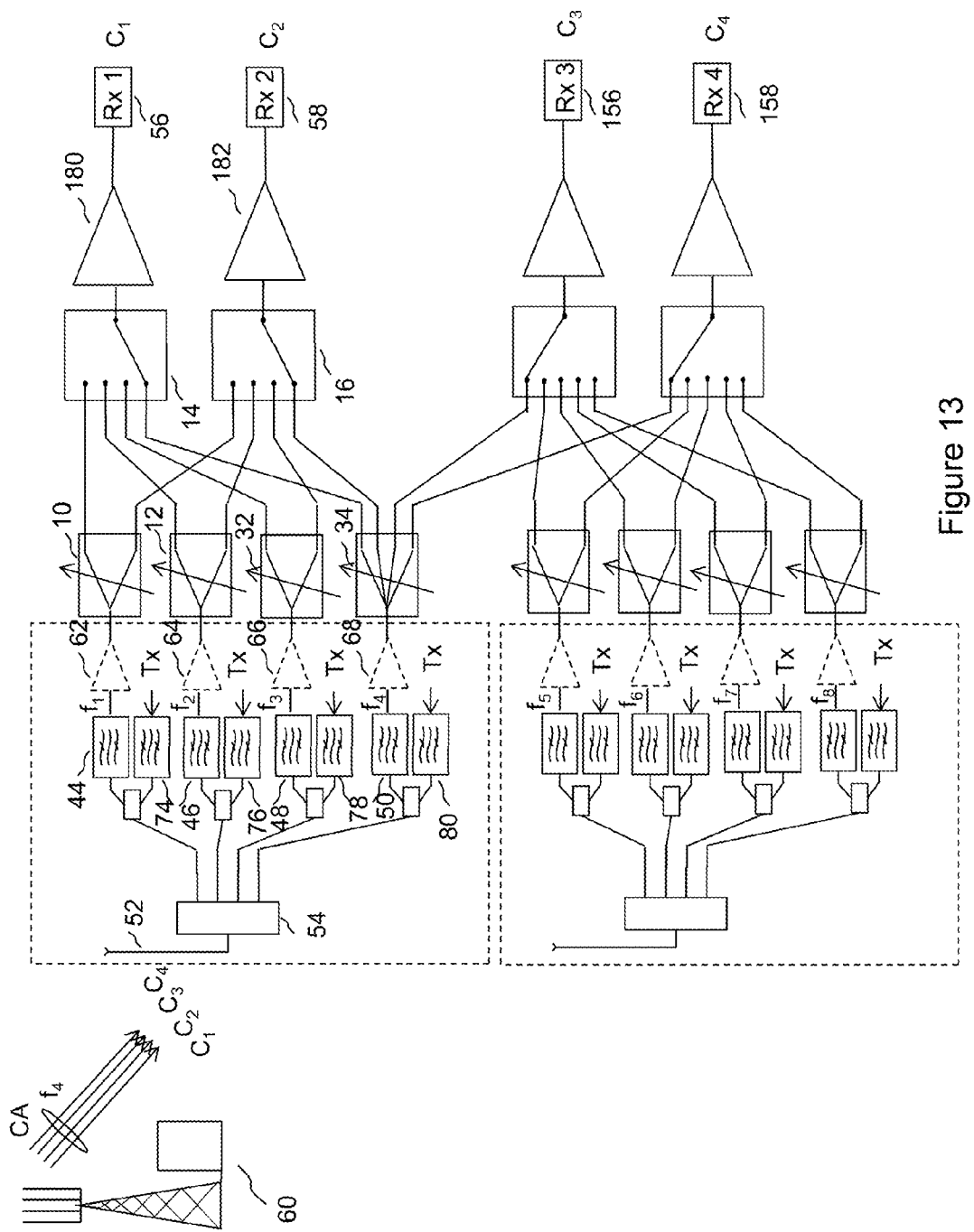
FIG. 13 is a schematic diagram showing a receiver including a radio frequency circuit in an embodiment of the invention, showing an arrangement for receiving four radio frequency signals aggregated within the same band.

FIG. 12 shows parts of a Time Division Duplex system including both transmit 74, 76, 78, 80 and receive 44, 46, 48, 50 front end filters. As shown in FIG. 13, transmit and receive filters may be connected separately the antenna switching arrangement 54, which may perform a transmit/receive switching function.

FIG. 12 also shows that the antenna switching arrangement 54 may be used to connect multiple antennas to the transmit and receive filters. The use of multiple antennas may be applied to either a Time Division Duplex or a Time. Division Duplex system. Multiple antennas may also be used with other systems, for example MIMO (Multiple Input Multiple Output), Diversity, and multi SIM/USIM systems in multi stand by or multi active use cases.

The antenna switching arrangement 54 may be used to configure the system to provide diversity reception antenna, MEMO reception antennas, and/or separate transmit/receive antennas and/or multi SIM/USIM multi stand by/multi active use case. Also, alternative antennas may be selectable according to the frequency range to be received.

Transmit and receive filters may include some or all respective transmit and receive parts of filter, duplexer or triplexer filters. Filters may share a common antenna, or each may have a dedicated antenna. A common antenna may be shared between multiple filters by means of a diplexer or duplexer within the antenna switching arrangement.

FIG. 13 shows an arrangement whereby a plurality of radio frequency signals, that is to say component carriers, may be aggregated, and each radio frequency signal may be received by use of one or more signal dividers each arranged to split a signal into a plurality of parts, each part to be connected to respective radio frequency switch for connection to a respective receiver or receiver chain. So, in the case of FIG. 13, four component carriers $C_1$ $C_2$ $C_3$ $C_4$ are shown within band $f_4$ transmitted using carrier aggregation. They are received by the one or more antennas in the antenna arrangement 52, and switched by the antenna switching arrangement 54 to receive filter 50, which is connected to a signal path leading to signal divider 34. The signal divider 34 may be programmable to split the signal between outputs according to a programmable divide ratio. In the example shown, the signal is split equally between the four outputs, so that the signal including the four component carriers may be fed to each of the four receivers 56, 58, 156, 158, each receiver being typically used to receive a respective one of the component carriers. Alternatively, the divider may be programmed to divide three, two or one way, or to provide a variable divide ratio between the outputs, for example to provide an automatic gain control function. In general, a signal divider may be provided to divide a signal into any number of parts for connection to any number of receivers.

FIG. 14 illustrates that the radio frequency circuit may be used at any terminal, such as a base station such as an eNodeB or a user equipment (UE). In addition, multiple antennas may be deployed at either the base station, user equipment, or both, to provide transmit and/or receive diversity, Multiple input Multiple Output (MIMO), Single Input Multiple Output (SIMO), Multiple Input Single Output (MISO), and/or multi SIM/USIM multi stand by/multi active use case and/or switchable antennas according to operating frequency range. Carriers above and other embodiment through specification and claims may have different modulation, different number of subcarriers, carrier aggregation between different bands, contiguous carrier aggregation at one band, non-contiguous carrier aggregation at one band, carrier aggregation between different bands and non-contiguous carrier aggregation at least one of band.

By way of a recap of the foregoing description, an exemplary embodiment provides a radio frequency circuit, which, in operation, receives at least a first and second radio frequency signal, using a radio frequency circuit that is configurable to a first mode for use when the first and second radio frequency signals are within a first frequency band, and is configurable to a second mode for use when the first radio frequency signal is within the first frequency band and the second radio frequency signal is within a second frequency band, different from the first frequency band. The radio frequency circuit performs the steps of:

using a first signal divider to divide signals received in the first frequency band between a first divider output and at least a second divider output;

using a second divider to divide signals received in the second frequency band between a third divider output and at least a fourth divider output;

setting a first radio frequency switch to connect the first divider output to a first switch output for connection to a first receiver chain for receiving the first radio frequency signal in the first and second modes;

setting a second radio frequency switch to connect the second divider output to a second switch output in the first mode and to connect the third divider output to the second switch output in the second mode, the second switch output being for connection to a second receiver chain for receiving the second radio frequency signal;

in which the first signal divider is configured with a division ratio and the method includes setting the division ratio of the first signal divider to a first division ratio in the first mode and to a second division ratio, different from the first ratio, in the second mode.

In this embodiment, a combination of at least said first and second radio frequency signals may be used for radio communication using carrier aggregation. Further, said first and second radio frequency signals may be used for multi-SIM reception at the terminal. Indeed, in an embodiment of the invention, a terminal may operate in a multi-SIM operational mode, in which the terminal may receive paging signals from more than one communication system and the terminal may have radio communication links with a second communication system when a first communication system is active. Communication may be with communication counterparts that have the same or different operators, the same or different base stations, or that may be another terminal. Preferably, at least one of said first and second radio frequency signals is used for measurement of a radio channel and/or positioning measurements.

Typically there may be two or more uplink transmission links and downlink reception links. In some geographical areas these different radio communication links may operate at the same radio frequency range allocation, which may be appropriate to 2G (second generation), 3G (third generation), HSPA, LTE, LTE-A, or CDMA systems for example. As an example, the terminal may use two or more of the following systems operating in a frequency range at approximately 900 MHz: GSM900, B8 3G, B8HSPA, B8 LTE, B8 LTE CA, including MIMO/diversity reception. In the case of MIMO reception at least two antennas may be used. It may be advantageous to use a minimal set of antennas, especially at lower frequency ranges due to typically large volumes occupied by antennas. For example, different communications systems may share a common antenna and use common filtering. The terminal may have a filtering arrangement as illustrated in FIG. 13 connected to a main antenna interface and second filtering arrangement as illustrated in FIG. 14 connected to a second antenna interface. This second antenna interface may be used for MIMO reception and for communication with a second communication system at the same time as a first. For example duplexer 80 TX filter may be used for GSM800 transmission and duplexer 50 RX filter to aggregate GSM800 reception and B8 MIMO/diversity reception to the same reception chain.

When the reconfigurable radio frequency circuit is in operation, the division ratio of the first signal divider may provide a substantially equal division of power in the first mode and to provide a greater proportion of power to the first divider output than to the second divider output in the second mode. For example, the first signal divider may provide at least 10 dB more power to the first divider output port than to the second divider output port in the second mode.

As described above, the radio frequency circuit may include a first band pass filter connected to a signal path leading to the input of the first signal divider, a second band pass filter connected to a signal path leading to the input of the second signal divider, the pass band of the first band pass filter encompassing the first radio frequency band, and the pass band of the second band pass filter encompasses the second radio frequency band, and an antenna switching arrangement; when embodied with these components, the radio frequency circuit may control the antenna switching arrangement, in the first mode, to a first state in which the first and second radio frequency signals are connected from one or more antennas to the first band pass filter and controlling the antenna switching arrangement, in the second mode, to a second state in which the first and second radio frequency signals are connected from the one or more antennas to the first band pass filter and to the second band pass filter.

The first radio frequency switch may connect the first divider output to a first switch output when operating in the first mode, while the second radio frequency switch may connect the second divider output to a second switch output when operating in the first mode and connect the fourth divider output to the second switch output when operating in the second mode.

The division ratio of the first signal divider may be set to provide a substantially equal division of signal in the first mode and to provide a greater proportion of power to the first divider output than to the second divider output in the second mode. For example, the first signal divider may provide at least 10 dB more power to the first divider output port than to the second divider output port in the second mode.

In one embodiment, when in the first mode, the division ratio may be set in dependence on a measurement of a signal power of the first radio frequency signal and in dependence on a measurement of a signal power of the second radio frequency signal, so as to alter a difference between a signal power of the first radio frequency signal at the first switch output and a signal power of the second radio frequency signal at the second switch output. In another embodiment, when in the second mode, the division ratio of the first signal divider and division ratio of the second signal divider may be set in dependence on a measurement of a signal power of the first radio frequency signal and in dependence on a measurement of a signal power of the second radio frequency signal, so as to alter a difference between a signal power of the first radio frequency signal at the first switch output and a signal power of the second radio frequency signal at the second switch output.

In a further arrangement, the reconfigurable radio frequency circuit is configurable to a third mode for use when the first radio frequency signal is within the first frequency band and the second radio frequency signal is within a third frequency band, different from the first and second frequency bands, the reconfigurable radio frequency circuit further including a third signal divider for dividing signal in the third frequency band, the third signal divider dividing signals between a fifth and sixth divider output, in which:

the first radio frequency switch connects the third divider output to the first switch output for connection to the first receiver chain for receiving the second radio frequency signal in the third mode, and the second radio frequency switch connects the first divider output to the second switch output for connection to the second receiver chain for receiving the first radio frequency signal, the method including;

the first signal divider, in the third mode, is configured to a third state in which a third signal division ratio is set between the first and second divider outputs, different from the first and second signal division ratios.

In this arrangement, the third signal division ratio of the first signal divider may be controlled to provide a greater proportion of power to the second divider output than to the first divider output in the third mode. For example, the first signal divider may provide at least 10 dB more power to the second divider output port than to the first divider output port in the third mode.

A controller or processing system may be provided to set the radio frequency circuit to the first, second, third, or other operating modes.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may include circuitry has well as possibly firmware) for embodying at least one or more of a data processor or modem processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non transitory) memory and executable by the processor, or by hardware, or by a combination of tangibly stored software and hardware (and tangibly stored firmware).

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A reconfigurable radio frequency circuit for use in a wireless communications terminal, the circuit comprising:
   a receiver for receiving at least first and second radio frequency signals;

a first signal divider for dividing signals in a first frequency band, the first signal divider being arranged to divide signals between at least a first divider output and a second divider output;

a second signal divider for dividing signals in a second frequency band, the second signal divider being arranged to divide signals between at least a third divider output and a fourth divider output;

a first radio frequency switch for connecting the first divider output to a first switch output for connection to a first receiver chain for receiving the first radio frequency signal in a first and a second mode, the circuit being configurable to the first mode for use when the first and second radio frequency signals are within the first frequency band, and being configurable to the second mode for use when the first radio frequency signal is within the first frequency band and the second radio frequency signal is within the second frequency band, different from the first frequency band; and a second radio frequency switch for connecting the second divider output to a second switch output in the first mode and to connect the fourth divider output to the second switch output in the second mode, the second switch output being for connection to a second receiver chain for receiving the second radio frequency signal, wherein the first signal divider is configured with a signal division ratio and is controllable, in the first mode, to a first state in which a first signal division ratio is set between the first and second divider outputs, and in the second mode, to a second state in which a second signal division ratio, different from the first signal division ratio, is set between the first and second divider outputs.

2. A reconfigurable radio frequency circuit according to claim 1, wherein a combination of at least said first and second radio frequency signals is used for radio communication using carrier aggregation.

3. A reconfigurable radio frequency circuit according to claim 1, wherein said first and second radio frequency signals are used for multi-SIM reception at the terminal.

4. A reconfigurable radio frequency circuit according to claim 1, wherein at least one of said first and second radio frequency signals is used for measurement of a radio channel and/or positioning measurements.

5. A reconfigurable radio frequency circuit according to claim 1, wherein the signal division ratio of the first signal divider is controllable to provide a substantially equal division of signal in the first mode and to provide a greater proportion of signal to the first divider output than to the second divider output in the second mode.

6. A reconfigurable radio frequency circuit according to claim 5, wherein the first signal divider is controllable to provide at least 10 dB more signal to the first divider output than to the second divider output in the second mode.

7. A reconfigurable radio frequency circuit according to claim 1, further comprising:

a first band pass filter connected to a signal path leading to an input of the first signal divider; and a second band pass filter connected to a signal path leading to an input of the second signal divider, wherein a pass band of the first band pass filter encompasses the first frequency band, and a pass band of the second band pass filter encompasses the second frequency band.

8. A reconfigurable radio frequency circuit according to claim 7, further comprising an antenna switching arrangement, wherein the antenna switching arrangement is controllable, in the first mode, to a first state in which the first and second radio frequency signals are connected from one or more antennas to the first band pass filter and controllable, in the second mode, to a second state in which the first and second radio frequency signals are connected from the one or more antennas to the first band pass filter and to the second band pass filter.

9. A reconfigurable radio frequency circuit according to claim 1, comprising a controller arranged to:

set the division ratio of the first signal divider to the first signal division ratio in the first mode and to the second signal division ratio in the second mode;

set the first radio frequency switch to connect the first divider output to the first switch output when operating in the first mode; and set the second radio frequency switch to connect the second divider output to the second switch output when operating in the first mode and to connect the fourth divider output to the second switch output when operating in the second mode.

10. A reconfigurable radio frequency circuit according to claim 9, wherein the controller is arranged to:

set the division ratio of the first signal divider to provide a substantially equal division of signal in the first mode and to provide a greater proportion of power to the first divider output than to the second divider output in the second mode.

11. A reconfigurable radio frequency circuit according to claim 10, wherein the controller is arranged to:

set the first signal divider to provide at least 10 dB more power to the first divider output than to the second divider output in the second mode.

12. A reconfigurable radio frequency circuit according to claim 9, wherein the controller is arranged to:

in the first mode, set the division ratio of the first signal divider in dependence on a measurement of a signal power of the first radio frequency signal and in dependence on a measurement of a signal power of the second radio frequency signal, so as to alter a difference between a signal power of the first radio frequency signal at the first switch output and a signal power of the second radio frequency signal at the second switch output.

13. A reconfigurable radio frequency circuit according to claim 9, wherein the controller is arranged to:

in the second mode, set the division ratio of the first signal divider and a division ratio of the second signal divider in dependence on a measurement of a signal power of the first radio frequency signal and in dependence on a measurement of a signal power of the second radio frequency signal, so as to alter a difference between a signal power of the first radio frequency signal at the first switch output and a signal power of the second radio frequency signal at the second switch output.

14. A reconfigurable radio frequency circuit according to claim 1, the circuit being further configurable to a third mode for use when the first radio frequency signal is within the first frequency band, and the second radio frequency signal is within a third frequency band, different from the first and second frequency bands, the circuit further comprising:

a third signal divider for dividing a signal in the third frequency band, the third signal divider being arranged to divide a signal between a fifth divider output and a sixth divider output, wherein the first radio frequency switch is configurable to connect the third divider output to the first switch output for connection to the first receiver chain for receiving the second radio frequency signal in the third mode, and the second radio frequency switch is configurable to connect the first divider output to the second switch output for connection to the second receiver chain for receiving the first radio frequency signal, wherein the first signal divider is controllable, in the third mode, to a third state in which a third signal division ratio is set between the first and second divider outputs, different from the first and second signal division ratios.

15. A reconfigurable radio frequency circuit according to claim 14, wherein the third signal division ratio of the first signal divider is controllable to provide a greater proportion of power to the second divider output than to the first divider output in the third mode.

16. A reconfigurable radio frequency circuit according to claim 15, wherein the first signal divider is controllable to provide at least 10 dB more power to the second divider output than to the first divider output in the third mode.

17. A reconfigurable radio frequency circuit according to claim 1, the wireless communications terminal being arranged to receive at least a further radio frequency signal, wherein the first signal divider comprises at least a further divider output and the circuit comprises at least a third radio frequency switch for connecting the further divider output to a further switch output for connection to a further radio receiver for receiving the further radio frequency signal, and wherein the first signal divider is controllable to divide a signal between the first, second, and further divider outputs in controllable proportions.

18. A reconfigurable radio frequency circuit according to claim 17, the circuit being configurable to a fourth mode for use when the first, second and further radio frequency signals are within the first frequency band, wherein the first signal divider is controllable, in the fourth mode, to a fourth state in which a signal is divided between the first, second and further divider outputs in substantially equal proportions.

19. A wireless communications terminal comprising a reconfigurable radio frequency circuit according to claim 1.

20. A method for use in a wireless terminal, the method comprising:

receiving at least first and second radio frequency signals, using a radio frequency circuit that is configurable to a first mode for use when the first and second radio frequency signals are within a first frequency band, and to a second mode for use when the first radio frequency signal is within the first frequency band and the second radio frequency signal is within a second frequency band, different from the first frequency band, using a first signal divider to divide signals received in the first frequency band between a first divider output and at least a second divider output;

using a second signal divider to divide signals received in the second frequency band between a third divider output and at least a fourth divider output;

setting a first radio frequency switch to connect the first divider output to a first switch output for connection to a first receiver chain for receiving the first radio frequency signal in the first and second modes;

setting a second radio frequency switch to connect the second divider output to a second switch output in the first mode and to connect the third divider output to the second switch output in the second mode, the second switch output being for connection to a second receiver chain for receiving the second radio frequency signal;

in which the first signal divider is configured with a division ratio and the method comprises setting the division ratio of the first signal divider to a first division ratio in the first mode and to a second division ratio, different from the first ratio, in the second mode.

21. A method according to claim 20, wherein:

a combination of at least said first and second radio frequency signals is used for radio communication using carrier aggregation; or said first and second radio frequency signals are used for multi-SIM reception at the terminal; or at least one of said first and second radio frequency signals is used for measurement of a radio channel and/or positioning measurements.

22. A method according to claim 21, the method comprising:

setting the division ratio of the first signal divider to provide a substantially equal division of power in the first mode and to provide a greater proportion of power to the first divider output than to the second divider output in the second mode.

23. A method according to claim 22, the method comprising:

controlling the first signal divider to provide at least 10 dB more power to the first divider output than to the second divider output in the second mode.

24. A method according to claim 20, the radio frequency circuit comprising a first band pass filter connected to a signal path leading to an input of the first signal divider, a second band pass filter connected to a signal path leading to an input of the second signal divider, a pass band of the first band pass filter encompassing the first frequency hand, and a pass band of the second band pass filter encompasses the second frequency band, and an antenna switching arrangement, the method comprising:

controlling the antenna switching arrangement, in the first mode, to a first state in which the first and second radio frequency signals are connected from one or more antennas to the first band pass filter and controlling the antenna switching arrangement, in the second mode, to a second state in which the first and second radio frequency signals are connected from the one or more antennas to the first band pass filter and to the second band pass filter.

* * * * *

UNITED STATES PATENT AND TRADEMARK OFFICE
CERTIFICATE OF CORRECTION

| | | |
|---|---|---|
| PATENT NO. | : 8,416,758 B1 | Page 1 of 1 |
| APPLICATION NO. | : 13/671731 | |
| DATED | : April 9, 2013 | |
| INVENTOR(S) | : Seppo Rousu et al. | |

It is certified that error appears in the above-identified patent and that said Letters Patent is hereby corrected as shown below:

On the Title page:

In Item (74) Attorney, Agent, or Firm, "Lucas & Mercanti LLP; Robert P. Michai" should read as follows:

--(74) Attorney, Agent, or Firm - Lucas & Mercanti LLP; Robert P. Michal--

Signed and Sealed this
Eighteenth Day of June, 2013

Teresa Stanek Rea
*Acting Director of the United States Patent and Trademark Office*